United States Patent
Weigl

(10) Patent No.: US 10,583,520 B2
(45) Date of Patent: Mar. 10, 2020

(54) DEVICE AND METHOD FOR HOMOGENEOUSLY WELDING TWO-DIMENSIONALLY BENT STRUCTURES BY FRICTION STIR WELDING

(71) Applicant: GRENZEBACH MASCHINENBAU GMBH, Asbach-Baeumenheim (DE)

(72) Inventor: Markus Weigl, Donauwoerth (DE)

(73) Assignee: GRENZEBACH MASCHINENBAU, Asbach-Baeumenheim (DE)

( * ) Notice: Subject to any disclaimer, the term of this patent is extended or adjusted under 35 U.S.C. 154(b) by 0 days.

(21) Appl. No.: 15/751,019

(22) PCT Filed: Aug. 10, 2016

(86) PCT No.: PCT/DE2016/000312
§ 371 (c)(1),
(2) Date: Feb. 7, 2018

(87) PCT Pub. No.: WO2017/025078
PCT Pub. Date: Feb. 16, 2017

(65) Prior Publication Data
US 2018/0221987 A1 Aug. 9, 2018

(30) Foreign Application Priority Data
Aug. 13, 2015 (DE) .................. 10 2015 010 638

(51) Int. Cl.
B23K 20/12 (2006.01)
B23K 37/02 (2006.01)
B23K 101/04 (2006.01)

(52) U.S. Cl.
CPC ........ B23K 20/1235 (2013.01); B23K 20/129 (2013.01); B23K 20/1245 (2013.01);
(Continued)

(58) Field of Classification Search
CPC ............ B23K 20/1235; B23K 20/1255; B23K 37/0276; B23K 20/129; B23K 2101/04; B23K 20/122–125; B23K 2101/12–125
(Continued)

(56) References Cited

U.S. PATENT DOCUMENTS 5,697,511 A * 12/1997 Bampton ........... B23K 20/1265
220/4.12
6,264,088 B1 * 7/2001 Larsson ............... B23K 20/125
228/2.1
(Continued)

FOREIGN PATENT DOCUMENTS

CA 2994764 A1 * 2/2017 ......... B23K 37/0276
CA 3017637 A1 * 9/2017 ........... B23K 20/122
(Continued)

OTHER PUBLICATIONS

Machine translation of DE 202014003072A (no date available).*
Machine translation of DE 202015000949A (no date available).*
Machine translation of DE 202015005763A (no date available).*

*Primary Examiner* — Kiley S Stoner
(74) *Attorney, Agent, or Firm* — Duane Morris LLP; Gregory M. Lefkowitz; Jason M. Nolan

(57) ABSTRACT

The invention relates to a device and to a method for homogeneously welding two-dimensionally bent structures by friction stir welding.

11 Claims, 4 Drawing Sheets

(52) U.S. Cl.
CPC ...... *B23K 20/1255* (2013.01); *B23K 37/0276* (2013.01); *B23K 2101/04* (2018.08)

(58) Field of Classification Search
USPC ........................................ 228/112.1, 2.1, 184
See application file for complete search history.

(56) References Cited

U.S. PATENT DOCUMENTS

| | | | | |
|---|---|---|---|---|
| 6,484,924 | B1* | 11/2002 | Forrest ................. | B23K 20/126 228/103 |
| 8,123,104 | B1* | 2/2012 | Potter ................. | B23K 37/0533 228/2.1 |
| 9,937,586 | B2* | 4/2018 | Weigl ................. | B23K 20/1265 |
| 2002/0050508 | A1* | 5/2002 | Yoshinaga ........... | B23K 20/123 228/112.1 |
| 2005/0035179 | A1* | 2/2005 | Forrest ................. | B21D 22/16 228/112.1 |
| 2007/0158343 | A1* | 7/2007 | Shimada ............... | F17C 1/06 220/4.14 |
| 2007/0246461 | A1* | 10/2007 | Shimada ............... | F17C 1/00 220/4.12 |
| 2008/0296350 | A1* | 12/2008 | Henneboehle ..... | B23K 20/1245 228/112.1 |
| 2011/0052932 | A1* | 3/2011 | Pandey ................. | B22F 3/1216 428/598 |
| 2013/0068825 | A1* | 3/2013 | Rosal ................. | B23K 20/1215 228/114 |
| 2015/0102087 | A1* | 4/2015 | Foerg ................. | B23K 20/125 228/102 |
| 2015/0167144 | A1* | 6/2015 | Shijie ................. | B23K 35/404 427/560 |
| 2016/0346869 | A1* | 12/2016 | Weigl ................. | B23K 20/1265 |
| 2018/0111221 | A1* | 4/2018 | Larsson ............. | B23K 20/1245 |
| 2018/0221987 | A1* | 8/2018 | Weigl ................. | B23K 37/0276 |

FOREIGN PATENT DOCUMENTS

| | | | | |
|---|---|---|---|---|
| CN | 102049607 | | 5/2011 | |
| CN | 104259650 | | 1/2015 | |
| CN | 104439691 | | 3/2015 | |
| DE | 102004030381 | | 1/2006 | |
| DE | 102005032170 | | 1/2007 | |
| DE | 102012005397 | | 6/2012 | |
| DE | 202014000747 | | 3/2014 | |
| DE | 202014003072 | | 6/2014 | |
| DE | 202015000949 | | 2/2015 | |
| DE | 102014004331 | | 6/2015 | |
| DE | 102014004331 B3 * | | 6/2015 | .......... B23K 20/124 |
| DE | 102014005315 | | 6/2015 | |
| DE | 102014005315 B3 * | | 6/2015 | .......... B23K 20/123 |
| DE | 102014001050 A1 * | | 7/2015 | ......... B23K 20/1245 |
| DE | 202015005763 U1 * | | 10/2015 | |
| DE | 102014010058 A1 * | | 1/2016 | .......... B23K 20/122 |
| EP | 2027962 | | 2/2009 | |
| EP | 2561948 | | 2/2013 | |
| JP | 2003236635 A * | | 8/2003 | |
| JP | 2004358513 | | 12/2004 | |
| JP | 2007083257 | | 4/2007 | |
| JP | 4008256 B2 * | | 11/2007 | |
| JP | 2018079510 A * | | 5/2018 | ......... B23K 20/1245 |
| WO | WO-2004096459 A1 * | | 11/2004 | .......... B21C 23/085 |

* cited by examiner

DEVICE AND METHOD FOR HOMOGENEOUSLY WELDING TWO-DIMENSIONALLY BENT STRUCTURES BY FRICTION STIR WELDING

CROSS-REFERENCE TO RELATED APPLICATIONS

This application is a § 371 national stage entry of International Application No. PCT/DE2016/000312, filed on Aug. 10, 2016, which claims priority to German Patent Application No. 10 2015 010 638.4, filed Aug. 13, 2015, the entire contents of which are incorporated herein by reference.

The invention relates to a device and to a method for homogeneously welding two-dimensionally bent structures by friction stir welding.

In terms of the prior art, inter alia, the publication EP 2 027 962 A1 which relates to a welding apparatus and to a welding method for the orbital welding of pipes is known from the patent literature. Some disadvantages of the known prior art are mentioned in this publication, the elimination of said disadvantages being the objective of the present application. According to the details in claim 1, said welding apparatus herein is an electric-arc welding apparatus comprising a welding head for applying a welding arc by way of a welding output onto a joint between a first and a second workpiece, in order to generate a weld pool, wherein the welding arc is movable relative to the first and to the second workpiece. It is claimed as the invention here in the characterizing part of claim that the welding apparatus comprises a temperature measuring device for measuring temperature in the vicinity of the weld pool and a closed-loop control device, wherein the closed-loop control device is configured for generating at least one signal, depending on the temperature measured, which signal serves for controlling at least one welding parameter. It is further claimed that the temperature measuring device herein is preferably configured as a pyrometer and/or that the temperature measuring device is disposed such that the temperature is measured at least at one temperature measuring point in front of, beside and/or behind the weld pool, wherein the temperature measuring device is preferably disposed such that the latter comprises a region of which the temperature permits a conclusion to be drawn in terms of the weld pool temperature.

In general, the orbital welding of tubular components by way of conventional welding methods such as MIG or MAG welding, by virtue of the effect of gravity on the melt and the protective gas, leads to a very high complexity in terms of process control. When orbital welding is used in the field, for example in underground electrical grids and pipelines, conventional orbital methods are moreover very delicate in terms of the environmental conditions. Wind and prevailing moisture here can seriously affect the welding process.

Reference in terms of the prior art is further made to EP 2 561 948 A1 which relates to a method and to a system for producing a flange-pipe-flange element by means of friction stir welding. According to the preamble of claim 11, such a system is based on the objective of simplifying the centering of the flange and of the pipe, and of utilizing the weld pool backing, apart from for supporting the region that is softened by the friction stir welding, also for receiving the contact-pressure forces in friction stir welding and for centering the pipe according to the longitudinal axis of the flanges, while dispensing with measuring and setting-up procedures and simultaneously reducing the production times with savings in terms of material and guaranteeing economic benefits. To this end it is claimed in the characterizing clause of claim 11 that the weld pool backing is configured as a pneumatically clampable and releasable clamping and supporting disc for centering the pipe on the rotation axis of the flanges, and for receiving the contact-pressure forces in friction stir welding, and that a sensor for sensing the butt joints between the pipe and the flange is provided, and that furthermore a device for driving in and driving out a shaping wedge in the projection of the tangential plane that lies horizontally above the rotation axis and runs through the butt joint is provided in order for the friction stir welding probe of the friction stir welding tool to be moved out of the friction stir welded butt joint without leaving a hole, wherein the sensor and the device for driving in and driving out the shaping wedge are connected to the controller.

In friction stir welding, friction heat which transforms the materials to be welded into a plasticized state is generated in the joint region of the materials to be welded by means of the friction between a rotating tool that is simultaneously moved in a translatory manner and is applied by way of pressure. The tool herein is moved along the joint region and stirs the plasticized material in the interior of the seam of the mutually abutting materials to be connected. The tool at the end of this seam is withdrawn from the connection region and the weld seam is immediately stressable.

The present invention is based on the object of specifying a device and a method for enabling homogeneous welding of two-dimensionally bent structures by means of friction stir welding at high quality standards, wherein the overall process energy to be invested is to be minimized.

Two-dimensionally bent structures can be considered to be pipes having a round, elliptic, or ovoid cross section, or else metal sheets that are bent in a corrugated manner.

This is achieved according to claim 1:

a device for homogeneously welding two-dimensionally bent structures in the form of at least two mating partners (6) by friction stir welding, the device having the following features:

a) a receptacle plate (1) that is guided by a guiding machine and has a drive head (2) and a tool dome (3) that is fastened to said drive head (2) and has a welding shoe mounting (4) and a pin bearing (5) for a welding pin (11) of welding shoe (8);

b) the welding shoe (8) has a circular basic shape on which a transverse web is located, the latter running across the cross section of and orthogonally to said basic shape, said transverse web having approximately the width of ¼ to ⅕ of the diameter of the basic shape and having an arcuate shoe gliding face and shoe smoothing face, wherein a small planar face in the form of a notch-type taper, the chip-guiding step (9), is located on the front side of this face, in the region of the periphery of this face, and wherein the shoe gliding face and the shoe smoothing face corresponds substantially to the surface curvature of the mating partners (6);

c) the tool dome (3) has a strip-shaped sensor (23) which is configured for determining force, pressure, or travel and is attached to that side of the tool dome (3) that is opposite to the flow direction of the welding process, and wherein a cone constriction (17) is provided in the comparatively wide region of the tool receptacle cone (26), said cone constriction (17) serving for receiving a sensor (20) for acquiring the axial force, the torque, and the bending momentum on the welding pin (11), and wherein a further constriction in the front region of the tool receptacle cone (26) having at least three sensors (25), distributed at a spacing of 120 degrees on the circumference, for measuring the axial force that acts on the welding pin (11), and having a piezoelectric force measuring sensor (24), likewise for measuring the axial force, is provided in the longitudinal axis of the shaft (7) of the friction pin, and wherein a sensor signal amplifier having a rotary antenna (21) for receiving, for amplifying, and for transmitting all acquired measured values is provided, wherein these measured values are transmitted from a static antenna (22) to a machine controller, and wherein an induction power supply system for supplying the measuring system from a moving secondary coil (19) and from a fixed stationary primary coil (18) is provided. And it is claimed that the temperature of the welding pin (11) and/or of the welding shoe (8) are/is detected by means of a sensor.

And according to claim 3:

a method for homogeneously welding two-dimensionally bent structures in the form of at least two mating partners (6) by friction stir welding, the method having the following features:

a) a receptacle plate (1) that is guided by a guiding machine and has a drive head (2) and a tool dome (3) that is fastened to said drive head (2) and has a welding shoe mounting (4) and a pin bearing (5) for a welding pin (11) of a welding shoe (8) serves for carrying out the method;

b) in order for a welding result that is free of holes and has a flawless surface to be achieved on both sides of the mating partners (6), the measured parameters that are relevant for controlling the welding process are determined, wherein a strip-shaped sensor (23) is provided along the side of the tool dome (3) for detecting force, pressure, or travel, wherein a sensor (20) for acquiring the axial force, the torque, and the bending momentum on the welding pin (11) is provided, wherein at least three sensors (25) in the form of strain gauge strips that are distributed on the circumference of the tool receptacle cone (24) serve for measuring the axial force acting on the welding pin (11), and wherein a further piezoelectric force measuring sensor (24) is provided in the longitudinal axis of the shaft (7) of the friction pin, said piezoelectric force measuring sensor (24) likewise serving for measuring the axial force.

It is furthermore claimed that measuring and closed-loop controlling of the axial force that acts on the welding pin (11) is performed, measuring and closed-loop controlling of the torque that acts on the welding pin (11) is performed, and an automatic length adjustment of the welding pin (11) is performed by means of one or a plurality of piezoelectric actuator elements (not referred to in more detail), and measuring the temperature on the welding pin (11) is performed by means of an infrared sensor (not referred to in more detail). It is likewise claimed that measuring and closed-loop controlling of the compression force that acts on the welding shoe (8) is performed; that the advancement of the welding shoe (8) is performed so as to depend on the measured axial pressure on the welding shoe (8); that the temperature of said welding shoe (8) is measured by means of temperature sensors (not referred to in more detail); and that the configuration of the weld seam, the quality of the latter and the profile of the latter, is continuously monitored during the entire welding process in an optical manner and by means of quality parameters that correspond to the mating partners. A computer software program having a program code for carrying out the method steps, in the event of the program being carried out on a computer, is claimed, and a machine-readable medium having the program code of a computer software program for carrying out the method, in the event of the program being carried out on a computer, is claimed.

The device according to the invention will be described in more detail hereunder. In the individual figures.

Figure 1:
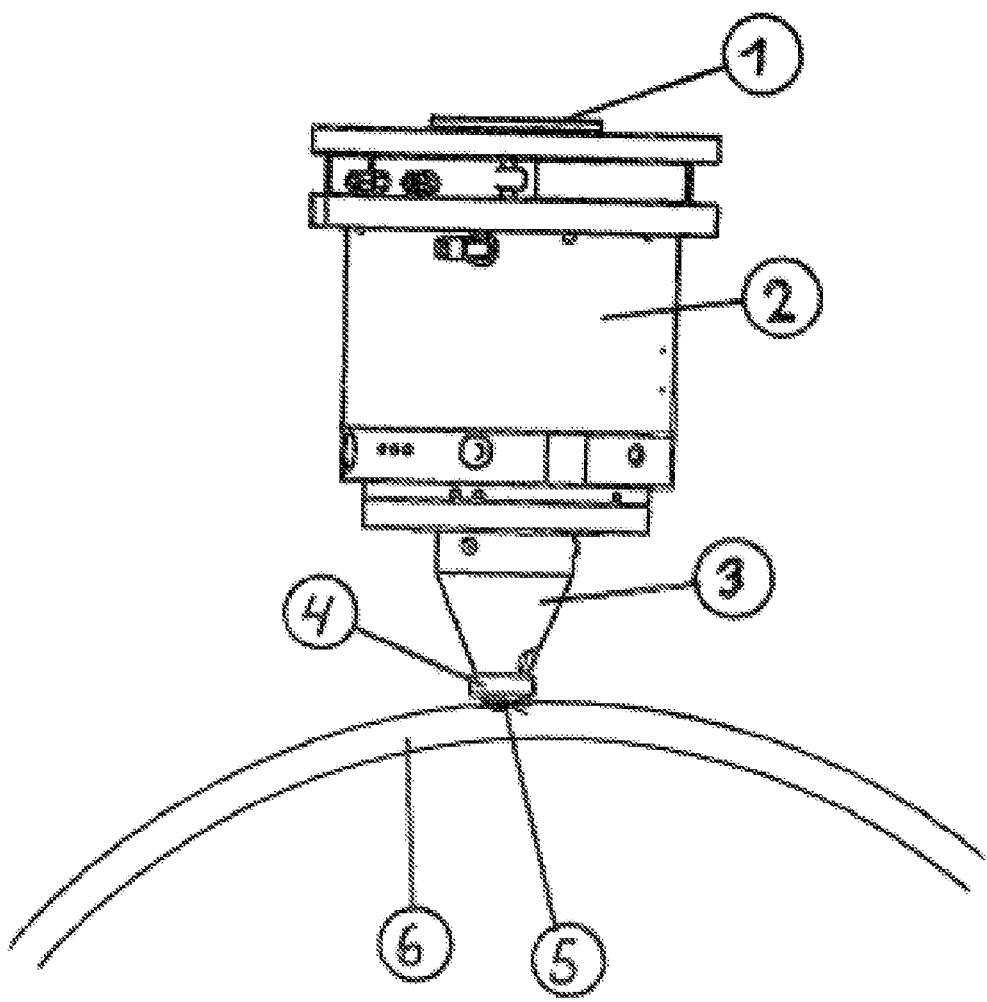
FIG. 1 shows a side view of an assembly for friction stir welding.

An assembly for friction stir welding on a two-dimensionally bent structure is shown in a side view in FIG. 1. A receptacle plate 1 which can be guided by a robotic arm (not shown here) supports a drive head 2 having a tool dome 3 for receiving a welding shoe. The welding shoe by way of the pin bearing 5 thereof is fastened herein to the holding cone 3 by an annular holder 4. The component of the bent structure of the two mating partners that is illustrated in the cross section and can be seen from the front is referred to by the reference sign 6.

Figure 2:
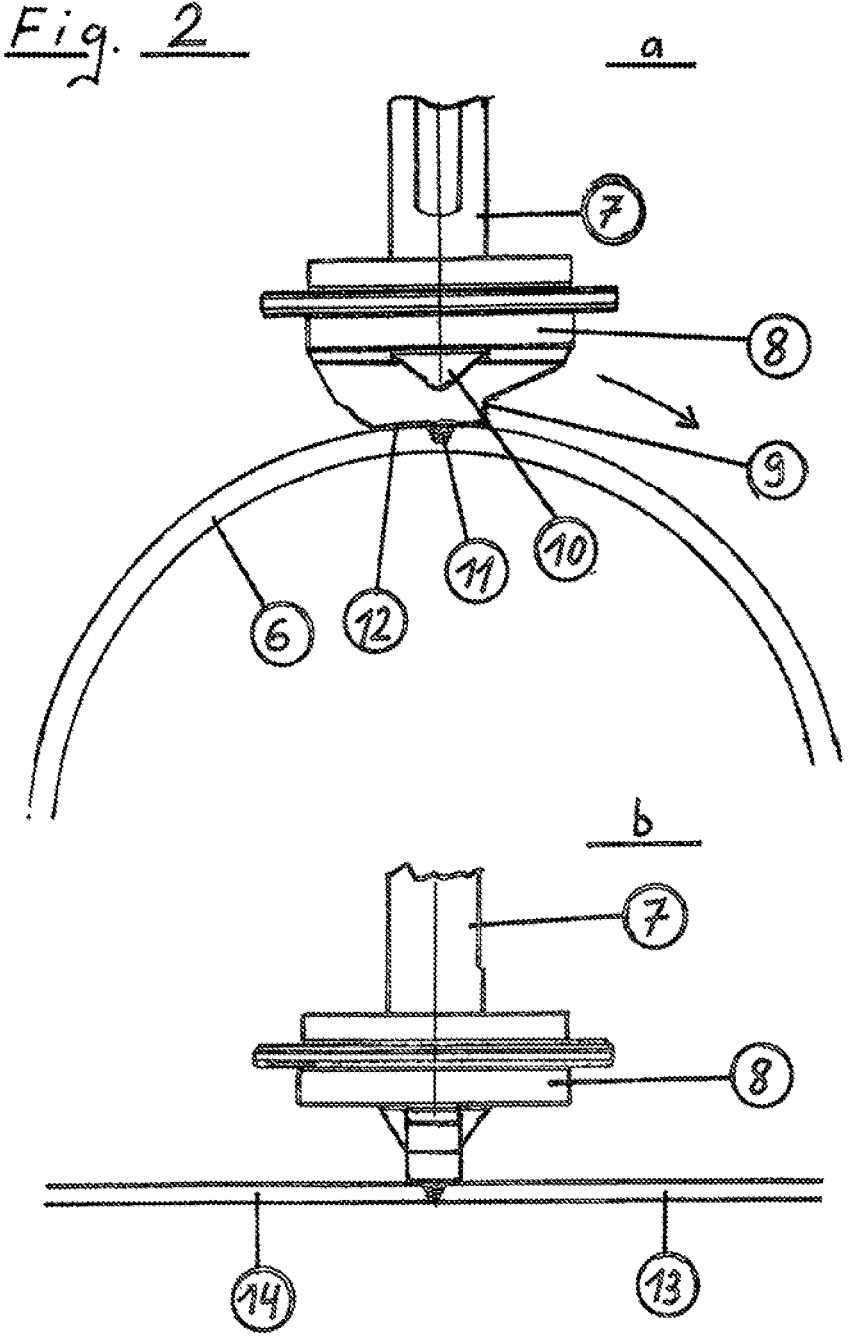
FIG. 2 shows the illustration of a preferred welding shoe.

FIG. 2 shows the illustration of a preferred welding shoe 8. A welding shoe 8 herein is illustrated in FIG. 2a so as to be transverse to the movement direction of the welding procedure across the two two-dimensionally bent mating partners which can be seen here in the cross section. Furthermore, the gliding face of the welding shoe 8 herein is adapted substantially to the curvature of the surface of the mating partners 6. The same welding shoe can be seen directly in the movement direction of the welding procedure in FIG. 2b, wherein the two mating partners can be seen in a linear shape, transverse to the curved face of said mating partners. The pin shaft 7 of the welding shoe 8, having the pin bearing 5 thereof, because of the holding mechanism of said pin shaft 7 can be seen in a different manner in the two figures. The material exit region 10 and the welding pin 11 are identified in FIG. 2a. The welding shoe (8) has a circular basic shape on which a transverse web is located, the latter running across the cross section of and orthogonally to said basic shape, said transverse web having approximately the width of ¼ to ⅕ of the diameter of the basic shape and having an arcuate shoe gliding face and shoe smoothing face, wherein a small planar face in the form of a notch-type taper, a chip-guiding step (9), is located on the front side of this face, in the region of the periphery of this face.

The chip-guiding step 9 is illustrated on the front side of the welding shoe 8, said front side being identifiable by means of the arrow shown for identifying the movement direction of the welding procedure. The respective mating partner 6 can be seen in a bent shape in FIG. 2a. The rear mating partner in the illustration of FIG. 2b is additionally referred to with the reference sign 13, and the front mating partner is additionally referred to with the reference sign 14.

Figure 3:
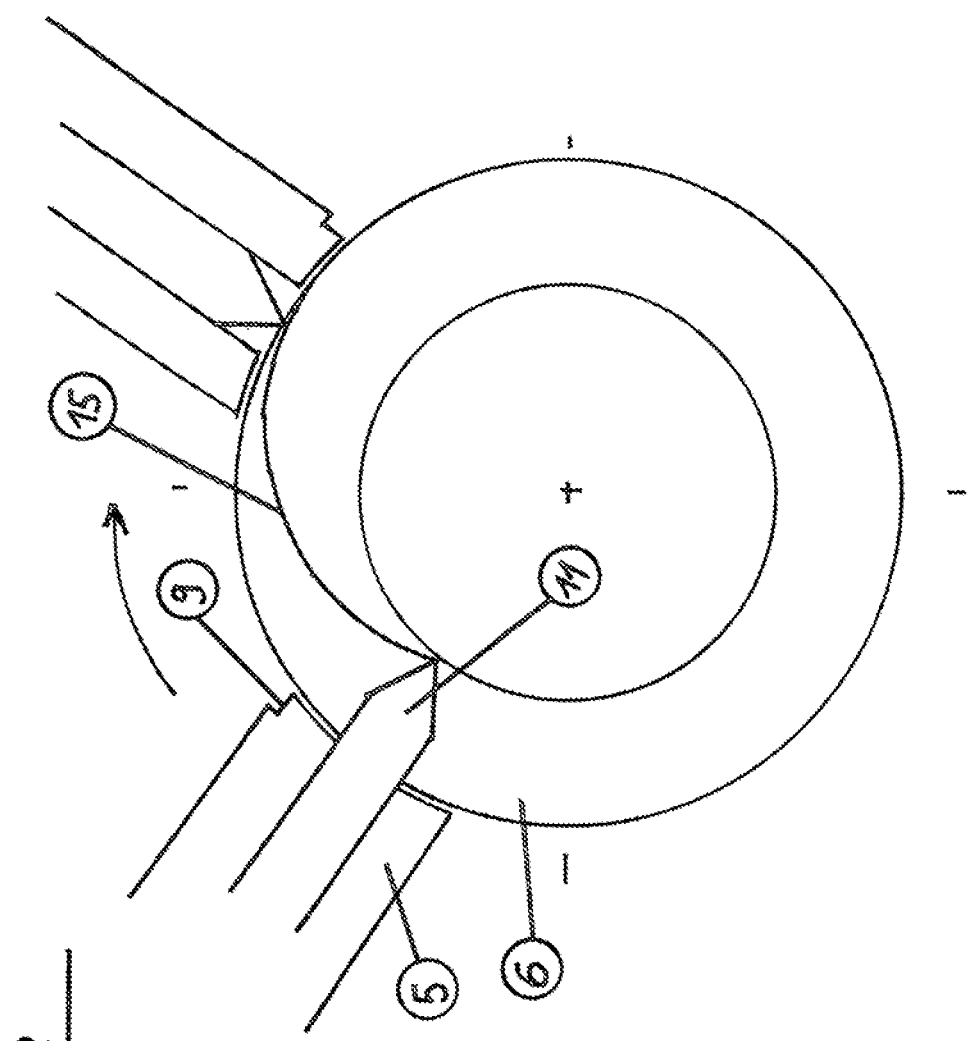
FIG. 3 shows the sectional illustration of a pin exit.

FIG. 3 shows the sectional illustration of a pin exit. The two concentric circles shown here represent the cross section of a mating partner 6 which in this case for reasons of the simplified illustration represents a pipe having small diameter in relation to the welding shoe 5 having the welding pin 11 thereof. In particular, the friction pin can have a conical shape of that end that is located in the material, in order for the volumetric modification in a withdrawal movement to be kept linear.

The welding pin 11 on the left side can be seen in a position in which said welding pin 11 commences the termination of the friction stir welding procedure and begins to reduce the pressure on the mating partners and to withdraw from the contact with the mating partners. Since the welding shoe 5 in this withdrawal procedure of the welding pin 11 continues to move on the path of the welding procedure in the direction of the arrow, the exit curve 15 illustrated is created from the superposition of the plotted movements.

This movement is composed of two proportions. The withdrawal of the pin is thus performed in the true sense, that is to say that the rotating element is additionally displaced in an axial manner. Furthermore, an advancement of the static non-rotating shoulder is performed while the rotating pin is not adjusted in a longitudinal manner. Position controlling of the friction pin and force controlling of the shoe is performed herein. Both closed-loop controlling actions have to be synchronized. In all cases, the compression process has to be ensured by corresponding contact-pressure conditions, that is to say that is essential for specific pressure conditions to be preserved.

The illustration shown in FIG. 3 is only exemplary. An exit curve that runs in a step-shaped manner, instead of the shown exit curve 15 that runs in a continuous manner, can likewise prove to be expedient on a case-by-case basis. However, in the case of all procedures described it is important to have knowledge pertaining to the temperature of the welding pin 11. For this purpose, a particular temperature sensor (not shown in any figure), in particular an infrared sensor, is provided. The type of this temperature sensor depends in each case on the particular task and can determine the temperature of the welding pin either directly or indirectly by way of the measurement of the environmental temperature of the respective welding process.

The exit curve 15 and the entire welding process herein are 3D-capable. This means that the entire welding process due to the acquisition of all relevant process parameters can be performed in real time in all spatial planes and in all spatial directions. It goes without saying that the welding process does not leave behind any trace in the joint region, and that in particular no formation of holes in the exit region of the welding pin can be seen.

Figure 4:
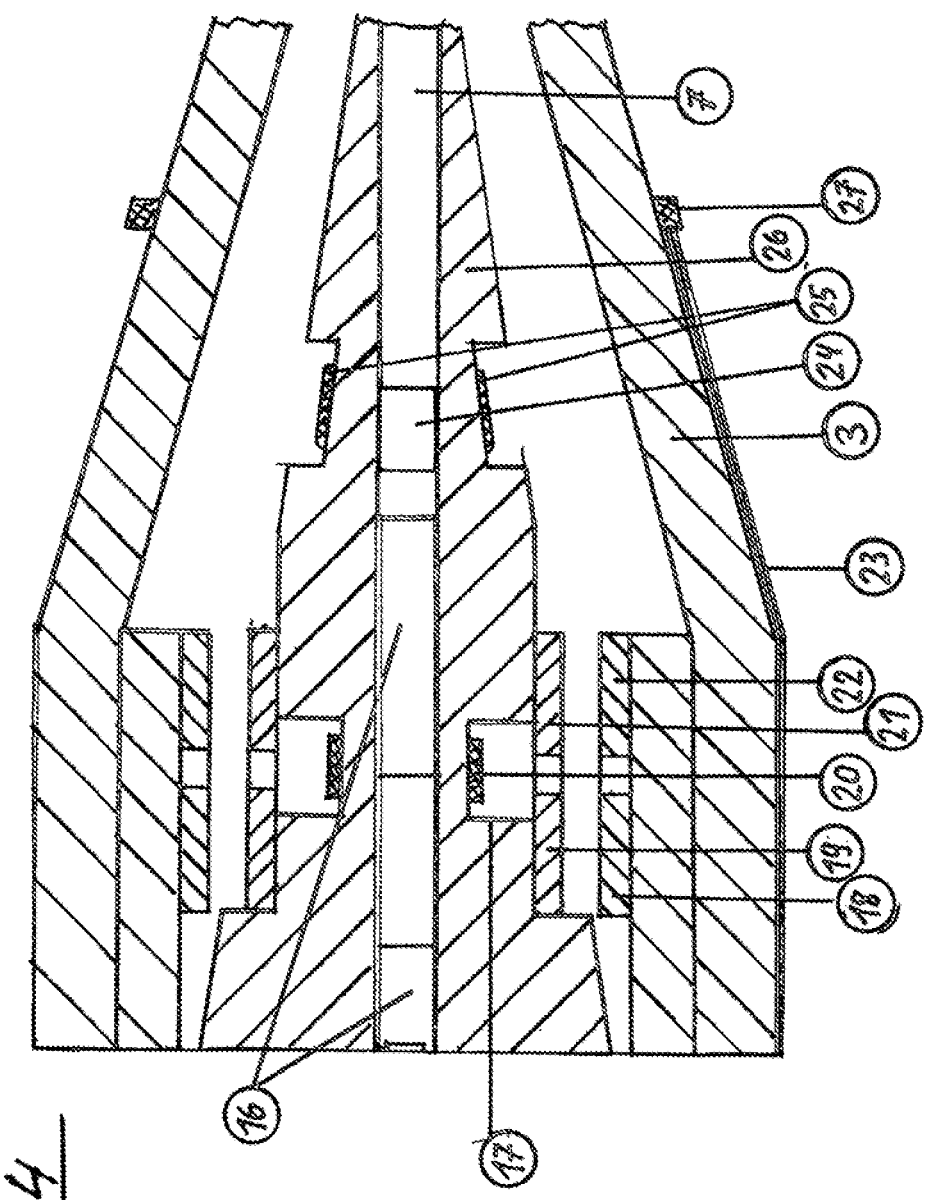
FIG. 4 shows details of the measured value acquisition in a holding cone 3.

FIG. 4 shows details of the measured value acquisition. The tool dome 3, having the tool receptacle cone 26, in this illustration is schematically illustrated in the section.

A two-part actuator element 16 for the axial adjustment of a shaft of the friction pin can be seen in the longitudinal axis of the holding cone as shown in FIG. 1. A sensor 23 together with the associated amplifier 27 thereof and the antenna thereof can be seen here on the lower side of the tool dome 3 that is shown in the section. This sensor 23, by way of an example in the form of a strain gauge strip on the external side of the tool dome 3, serves for acquiring the deformation of the tool dome 3. The strain gauge strip here is exemplary; this can also be a sensor 23 for determining force, pressure, or travel. This strain gauge strip that in the longitudinal direction is attached to the external side of the tool dome 3 is therefore attached to that side of the tool dome 3 that is opposite to the machining direction because the most intense deformation of the tool dome 3 is to be expected here. As has already been mentioned, an amplifier 27 having the antenna thereof serves for amplifying the measured signal determined by the sensor 23.

The tool receptacle cone 26 shown, having the shaft of the friction pin 7, in the wider region of said tool receptacle cone 26 herein allows a cone constriction 17 which serves for receiving a sensor 20 to be seen. In order to be highlighted, said constriction herein is shown in a pronounced manner.

The mechanical constriction of the cross-section by the cone constriction 17, and the placing of the sensor 20 performed at this location, enable the axial force and the torque engaging on the tool receptacle cone 26, and the bending momentum arising herein, to be measured. The signal transmission of the measured values determined by the sensor 20 is performed by way of a signal amplifier 21 that is rotatable conjointly with the tool receptacle cone 26, and by way of a rotary antenna. The reception and the transmission of the measured values determined by the sensor 20 is performed by way of a static stationary antenna 22. A further constriction (not referred to in more detail) which offers space for strain gauge strips 25 and which enables the axial force acting on the pin shaft 7 and thus directly on the welding pin tip to be measured is located in the forward region of the tool receptacle cone 26. The strain gauge strips 25 are composed of, for example, three strips which are attached to the circumference of the tool receptacle cone 26 so as to be spaced apart by 120 degrees in the illustrated constriction. More than three strips can also be attached here so as to be distributed on the circumference. A piezo electric force measuring sensor 24 which likewise serves for measuring the axial force can optionally be additionally located here in the longitudinal axis of the pin shaft 7. The measured values of the sensors 24 and 25 can be simultaneously acquired in the operation for particularly sensitive processes and be correlated with one another in order for measuring faults to be excluded. The reception and the transmission of the measured values determined by the sensors 24 and 25 is likewise performed over the static stationary antenna 22. An inductive power supply, the static primary coil thereof being identified with the reference sign 18 and the movable secondary coil thereof being identified with the reference sign 19 serves for supplying power to the measuring systems described.

As has already been described in the description pertaining to FIG. 3, all process parameters of interest are acquired in real-time by means of the most varied of sensors in the welding method according to the invention. The following combinations of measured values on tools and respective actions in terms of process management are the substantial results.

a) The effective force is in each case measured on the welding shoe 8 and on the welding pin 11. The welding shoe 8 and the welding pin 11 herein are both impinged with a closed-loop controlled pressure.

b) The effective force is measured on the welding shoe 8, while the welding pin 11 maintains its position. The effective force on the welding shoe 8 is closed-loop controlled.

c) The position of the welding shoe 8 remains unchanged. The effective force on the welding pin 11 is measured and closed-loop controlled.

d) The effective force on the welding shoe 8 is measured; the welding shoe 8 is imparted an advancement. The torque, the advancement, and the pressure are measured on the welding pin 11.

e) The welding shoe 8 is operated using the effect of the chip guiding step 9; the temperature of the welding pin 11 is measured. The lift of the welding pin 11 is closed-loop controlled so as to depend on the torque transmitted and on the effective force.

Overall, measuring and closed-loop controlling the axial force that acts on the welding pin (11), and measuring and closed-loop controlling the torque that acts on the welding pin (11) is thus performed. Moreover, an automatic length adjustment of the welding pin (11) is performed automatically by means of one or a plurality of piezoelectric actuator element(s) (not referred to in more detail) which also has sensory measuring properties and measuring of the temperature on the welding pin (11) by means of an infrared sensor or the like (not referred to in more detail). Measuring and closed-loop controlling of the compression force that acts on the welding shoe (8) is furthermore performed. The advancement of the welding shoe (8) is performed so as to depend on the measured axial pressure on the welding shoe (8). The temperature of the latter is furthermore measured by means of temperature sensors (not referred to in more detail). The configuration of the weld seam, the quality thereof and the profile thereof, is continuously monitored during the entire welding process in an optical manner and by means of quality parameters that correspond to the mating partners.

The complex controlling of the movement sequences described requires a special control software program.

LIST OF REFERENCE SIGNS

1 Receptacle plate
2 Drive head
3 Tool dome for mounting a welding shoe
4 Welding shoe annular holder
5 Pin bearing
6 Mating partner
7 Shaft of the friction pin (pin shaft)
8 Welding shoe with pin bearing
9 Chip-guiding step
10 Material exit region
11 Welding pin
12 Gliding face of the welding shoe
13 Rear mating partner
14 Front mating partner
15 Path of a pin when exiting
16 Actuator element for the axial adjustment of the pin shaft
17 Cone constriction for receiving a sensor
18 Primary coil of the inductive power supply
19 Secondary coil of the inductive power supply
20 Sensor (strain gauge, for example) for the tool receptacle cone 16
21 Sensor signal amplifier and rotary antenna
22 Static antenna
23 Sensor on the welding shoe holding cone (strain gauge-pressure meter for the welding shoe)
24 Piezoelectric force measuring sensor
25 Sensor for measuring the axial force
26 Tool receptacle cone

The invention claimed is:

1. A device for homogeneously welding two-dimensionally bent structures in a form of at least two mating partners (6) by friction stir welding, the device comprising:
a receptacle plate (1) configured to be guided by a guiding machine;
a drive head (2);
a tool dome (3); wherein the tool dome is fastened to said drive head (2);
a welding shoe mounting (4); and
a pin bearing (5) adapted for a welding pin (11) of a welding shoe (8);
wherein the welding shoe (8) comprises a circular shape on which a transverse web is located, the transverse web running across a cross section of and orthogonally to said circular shape,
wherein said transverse web comprises:
a width of approximately ¼ to ⅕ of a diameter of the circular shape, and
an arcuate shoe gliding face and shoe smoothing face,
wherein a small planar face in the form of a notch-type taper, the chip-guiding step (9), is located on the front side of the small planar face, in a peripheral region of the small planar face, and
wherein the shoe gliding face and the shoe smoothing face corresponds substantially to the surface curvature of the mating partners (6);
wherein the tool dome (3) comprises:
a strip-shaped sensor (23) configured for determining force, pressure, or travel and is attached to a side of the tool dome (3) that is opposite to a flow direction of the welding process, and
wherein a cone constriction (17) is provided in a wide region of a tool receptacle cone (26), said cone constriction (17) serving for receiving a sensor (20) for acquiring axial force, torque, and bending momentum on the welding pin (11), and
wherein a further constriction in a front region of the tool receptacle cone (26) comprises at least three sensors (25), distributed at a spacing of 120 degrees on a circumference, for measuring the axial force acting on the welding pin (11), and a piezoelectric force measuring sensor (24), for measuring the axial force, is provided in a longitudinal axis of the shaft (7) of the friction pin, and
wherein a sensor signal amplifier having a rotary antenna (21) for receiving, for amplifying, and for transmitting all acquired measured values is provided,
wherein measured values are transmitted from a static antenna (22) to a machine controller, and
wherein an induction power supply system for supplying a measuring system from a moving secondary coil (19) and from a fixed stationary primary coil (18) is provided.

2. The device as claimed in claim 1, further comprising a sensor adapted to detect a temperature of the welding pin (11) and/or of the welding shoe (8).

3. A method for homogeneously welding two-dimensionally bent structures in the form of at least two mating partners (6) by friction stir welding, the method comprising:
providing two-dimensionally bent structures in the form of at least two mating partners;
providing a device for friction stir welding as claimed in claim 2;
providing a strip-shaped sensor (23) along the side of the tool dome (3) for detecting force, pressure, or travel,
providing a sensor (20) for acquiring axial force, torque, and bending momentum on the welding pin (11),
measuring the axial force acting on the welding pin (11) with at least three sensors (25) in the form of strain gauge strips that are distributed on the circumference of the tool receptacle cone, and
providing a piezoelectric force measuring sensor (24) in the longitudinal axis of the shaft (7) of the friction pin, said piezoelectric force measuring sensor (24) adapted for measuring the axial force; and
contacting the device for friction stir welding with the two-dimensionally bent structures in the form of at least two mating partners to form a weld seam.

4. The method as claimed in claim 3, further comprising measuring and closed-loop controlling the axial force acting on the welding pin (11), measuring and closed-loop controlling the torque acting on the welding pin (11), and adjusting the length of the welding pin (11), and measuring the temperature on the welding pin (11).

5. The method as claimed in claim 3, further comprising measuring and closed-loop controlling the compression force acting on the welding shoe (8);

advancing the welding shoe (8) based on the measured axial force acting on the welding pin (11); and measuring the temperature of said welding shoe (8).

6. The method as claimed in claim 3, further comprising, prior to measuring the axial force acting on the welding pin, measuring parameters for controlling the welding process to provide a welding result that is free of holes on both sides of the mating partners (6).

7. The method as claimed in claim 4, wherein the length of the welding pin is adjusted automatically by one or a plurality of piezoelectric actuator elements.

8. The method as claimed in claim 4, wherein an infrared sensor is used to measure the temperature on the welding pin (11).

9. The method as claimed in claim 5, wherein a temperature sensor is used to measure the temperature of said welding shoe (8).

10. The method as claimed in claim 5, further comprising monitoring the weld seam for configuration and profile during the contacting step.

11. The method of claim 10, wherein the configuration and profile for the weld seam is based on corresponding parameters of the at least two mating partners (6).

* * * * *